United States Patent Office 3,467,616
Patented Sept. 16, 1969

3,467,616
POLYVINYL HALIDE RESINOUS COMPOSITIONS PLASTICIZED WITH ALKENYLSUCCINIC AMIDE-LACTONES
James C. Wygant, Creve Coeur, and Erhard J. Prill, Des Peres, Mo., assignors to Monsanto Company, St. Louis, Mo., a corporation of Delaware
No Drawing. Division of application Ser. No. 144,559, Oct. 12, 1961. Continuation of application Ser. No. 713,283, Mar. 15, 1968. This application Mar. 18, 1968, Ser. No. 714,024
Int. Cl. C08f 45/44
U.S. Cl. 260—30.4
8 Claims

ABSTRACT OF THE DISCLOSURE

Resinous compositions of a vinyl halide polymer such as polyvinyl chloride and copolymers of at least 70 weight percent vinyl halide and up to 30 weight percent of an unsaturated comonomer copolymerizable therewith plasticized with an effective amount of an alkenylsuccinic amide-lactone defined by the illustrative structural formula

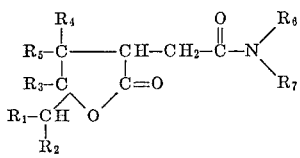

wherein $R_1$, $R_2$, $R_3$, $R_4$, $R_5$ and $R_6$ are each selected from the group consisting of hydrogen and alkyl radicals and $R_7$ is selected from the group consisting of alkyl, aryl, alkaryl, haloaryl, aralkyl and alkenyl radicals, and the R groups contain up to 20 carbon atoms.

---

This is a divisional application from our copending application Ser. No. 144,559, filed Oct. 12, 1961, now abandoned, and the continuation application Ser. No. 713,283, filed therefrom on Mar. 15, 1968.

This invention relates to polyvinyl halide resin compositions containing a plasticizing amount of an alkenylsuccinic amide-lactone.

The preparation of ester-lactones by esterifying alkenylsuccinic anhydrides with an alcohol to form an unsaturated acid-ester followed by lactonization to form the ester-lactone is disclosed and claimed in copending application Ser. No. 34, filed Jan. 4, 1960, now U.S. Patent No. 3,155,685. Attempts to prepare the amide-lactones in a similar manner from the alkenylsuccinic anhydrides and an amine followed by lactonization have resulted in failure.

We have now discovered that the amide-lactone of the alkenylsuccinic anhydrides can be prepared in good yield from acid-lactones, which are disclosed and claimed in copending application Ser. No. 144,586, filed of even date, and now abandoned, and amines.

The principal object of this invention is to provide polyvinyl halide resin compositions containing a plasticizing amount of an alkenylsuccinic amide-lactone.

Other objects and advantages of this invention will be apparent to one skilled in the art upon studying this disclosure.

In accordance with this invention, an alkenylsuccinic acid-lactone is reacted with an aliphatic or an aromatic amine to form an amide-lactone as illustrated by the following equation:

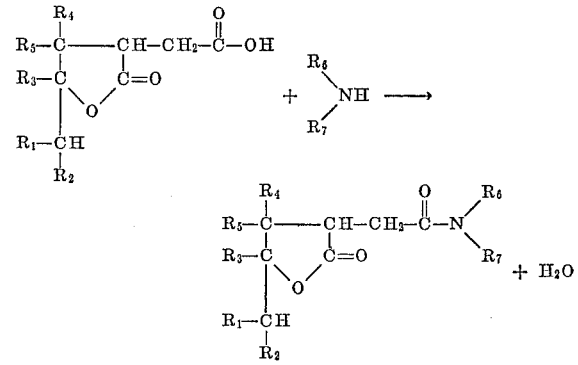

wherein $R_1$, $R_2$, $R_3$, $R_4$, $R_5$ and $R_6$ are each selected from the group consisting of hydrogen and alkyl radicals and $R_7$ is selected from the group consisting of alkyl, aryl, alkaryl, haloaryl, aralkyl, and alkenyl radicals. Although the amide-lactone usually has the structure shown above, various isomers are sometimes formed with some reactants.

Further, in accordance with this invention, there are provided, as new compounds, amide-lactones of the formula

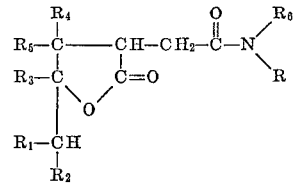

wherein $R_1$, $R_2$, $R_3$, $R_4$, $R_5$, $R_6$ and $R_7$ are as above defined.

Further, in accordance with this invention, there are provided improved polyvinyl halide resin compositions comprising a polyvinyl halide resin and a plasticizing amount of an amidelactone of the formula

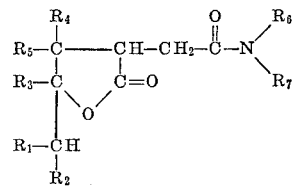

wherein $R_1$, $R_2$, $R_3$, $R_4$, $R_5$, $R_6$ and $R_7$ are as above defined.

The alkenylsuccinic acid-lactone reactants suitable for use in this invention can be prepared as disclosed and claimed in copending application Ser. No. 144,586, filed Oct. 12, 1961, and now abandoned, by the acid-catalyzed hydrolysis/lactonization of a 2-alkenylsuccinic anhydride. The 2-alkenylsuccinic anhydrides suitable for this purpose can have either a straight-chain or a branched-chain alkenyl group but the double bond of the alkenyl group must be located in the 2-position. For example, the alkenyl group can be a 2-propenyl, 2-methylallyl, 2-butenyl, 2-pentenyl, or the like. Succinic anhydrides substituted with a branched-chain alkenyl group, including alkenyl groups which are substituted with other groups besides those containing only carbon and hydrogen, are also very suitable. Thus, the $R_1$, $R_2$, $R_3$, $R_4$ and $R_5$ substituents in the equation above are either hydrogen or alkyl radicals, such as methyl, ethyl, butyl, hexyl, decyl, undecyl, pentadecyl, eicosyl, and the like. These substituents may be either the same or different. This invention is not limited by the number of carbon atoms in each of the $R_1$, $R_2$, $R_3$, $R_4$ and $R_5$ radicals and radicals containing any number of carbon atoms can be used; however, preferably, radicals having fewer than 21 carbon atoms are employed.

The amine reactants useful in the preparation of the alkenylsuccinic amide-lactones may be either aliphatic or aromatic and may be either primary or secondary amines. The aliphatic amines may be either straight-chain or branched-chain and may have either primary, secondary or tertiary substituents. Thus, $R_6$ in the equation above is either a hydrogen or alkyl radical such as methyl, ethyl, isopropyl, tert-butyl, octyl, dodecyl, hexadecyl, eicosyl, and the like. Further, $R_7$ in the equation above may be either an alkyl, aryl, alkaryl, haloaryl, aralkyl or alkenyl radical. Examples of suitable alkyl radicals are the same as those mentioned above. Examples of other suitable radicals for $R_7$ include aryl radicals such as phenyl; alkaryl radicals such as methylphenyl, diethylphenyl, isopropylphenyl and tert-amylphenyl; haloaryl radicals such as 2-chlorophenyl, 2,4-dibromophenyl, 4-iodophenyl, and 3-fluorophenyl; aralkyl radicals such as benzyl, amylbenzyl, phenylethyl and phenylpropyl; and alkenyl radicals such as propenyl, butenyl, pentadecenyl, and the like. This invention is not limited by the number of carbon atoms in each of the $R_6$ and $R_7$ radicals and radicals containing any number of carbon atoms can be used; however, preferably radicals having fewer than 21 carbon atoms are employed.

The process of this invention is usually carried out at a temperature below 300° C. because the use of more elevated temperatures sometimes results in the de-lactonization of the amide-lactone. The reactions can be conducted at temperatures as low as 125° C.; however, it is usually desirable to use a higher temperature in order to have relatively short reaction times. Preferably, a temperature in the range of 190–250° C. is used. Ordinarily, the reactions involved are carried out at substantially atmospheric pressure although pressures above atmospheric may be employed with the more volatile amines such as methyl amine. A catalyst is not required in the preparation of the alkenylsuccinic amide-lactone. Furthermore, an inert diluent or solvent is not normally used although an inert reaction medium could be used if desired. The reactions are usually carried out using at least a stoichiometric amount of the amine reactant and, preferably, an excess of the amine reactant.

Water is liberated as the reaction takes place and, preferably, the water is separated and removed as formed by azeotropic distillation. After completion of the reaction, the amide-lactone is recovered and purified in the usual manner, such as by distillation, solvent extraction, or selective adsorption procedures. The normally solid amide-lactones are also recovered by suitable crystallization procedures.

The aforesaid amide-lactone products are stable liquid and solid compounds which range in color from colorless to a light yellow. As liquids, they have high viscosities and relatively high boiling points. As solids, they have relatively high melting points, usually above 150° C. These amide-lactones have good solvent properties and are soluble in heptane, benzene, alcohols, ethers, ketones, and the like but generally insoluble in water.

The aforesaid amide-lactones are characterized by having low volatility and low extractibility characteristics, thereby finding extensive use as plasticizers for various synthetic resins, particularly the polyvinyl halide resins such as polyvinyl chloride, to form softened compositions of increased resiliency and flexibility which is retained at low temperatures as well as at high temperatures. The aforesaid amide-lactones are also compatible with other polymers such as polyvinyl butyral, cellulose acetate, cellulose acetate butyrate, polystyrene and certain polyacrylates. The amide-lactones are fully compatible with vinyl halide resins as is apparent by visual inspection of the plasticized compositions. Furthermore, the amide-lactones produce flexible polyvinyl halide compositions at room temperature as well as at lower temperatures where many plasticized polyvinyl halide compositions become brittle and useless. In addition, the plasticized polyvinyl halide compositions of this invention do not become brittle and useless with age or upon heating because these amide-lactones have very low volatility and are relatively insoluble in water.

The advantages, desirability and usefulness of the present invention are well illustrated by the following examples.

EXAMPLE 1

In this example, 2-carbodibutylaminomethyl-4-nonyl-gamma-valerolactone (and isomeric congeners) was prepared from the tetrapropenylsuccinic acid-lactone and di-(n-butyl)amine. Into a reaction flask was placed 0.23 mole of the acid-lactone. After heating the acid-lactone to a temperature of 200° C., 0.25 mole of di-(n-butyl) amine was added slowly with stirring and the reaction mixture heated for a period of 11.5 hours while maintaining the temperature in the range of 200–225° C. At the end of this time, the reaction mixture was washed with water, followed by washing with dilute hydrochloric acid, then sodium hydroxide, and finally washed with water before distillation. From the distillation step there was obtained the 2-carbodibutylaminomethyl-4-nonyl-gamma-valerolactone boiling at 184–190° C./0.13 mm. Hg having a refractive index $n_D^{25}$ 1.4755. Analysis of this product was found to be 73.1% carbon, 11.6% hydrogen and 3.7% nitrogen as compared with calculated values of 72.9% carbon, 11.5% hydrogen and 3.5% nitrogen.

EXAMPLE 2

In this example, 2 - carbodimethylaminomethyl - 4 - methyl-gamma-valerolactone was prepared from methylallylsuccinic acid-lactone and dimethylamine. Into a reaction flask was placed 0.25 mole of the acid-lactone. After heating the acid-lactone to a temperature of 210° C., dimethylamine was bubbled through the reaction mixture for a period of time of 2 hours while maintaining the temperature in the range of 210–220° C. At the end of this time, the reaction mixture was washed with water, followed by washing with sodium hydroxide, and finally washed with water before distillation. From the distillation step there was obtained the 2-carbodimethylaminoethyl-4-methyl-gamma-valerolactone in a yield of 91% boiling at 195–205° C./15 mm. Hg and having a refractive index $n_D^{25}$ 1.4772. Analysis of this product was found to be 60.3% carbon, 8.6% hydrogen, and 7.0% nitrogen, the same as the calculated values.

EXAMPLE 3

In this example, 2 - carbomethylaminomethyl-4-nonyl-gamma-valerolactone was prepared from tetrapropenylsuccinic acid-lactone and methylamine. Into a reaction flask was placed 0.5 mole of the acid-lactone. After heating the acidlactone to a temperature of 215° C., the methylamine was bubbled through the acid-lactone over a period of 2.5 hours while maintaining the temperature at 215–222° C. At the end of this time, the reaction mixture was washed with water, followed by washing with sodium hydroxide before distillation. From the distillation step there was obtained the 2-carbomethylaminomethyl-4-nonylgamma-valerolactone boiling at 165–181° C./0.13 mm. Hg. The product had a refractive index $n_D^{25}$ 1.4843. Analysis of the product was found to be 69.0% carbon, 10.4% hydrogen and 4.6% nitrogen as compared with calculated values of 68.6% carbon, 10.5% hydrogen and 4.7% nitrogen.

EXAMPLE 4

In this example, 2 - carbohexylaminomethyl-4-nonyl-gamma-valerolactone was prepared from tetrapropenylsuccinic acid-lactone and n-hexylamine. Into a reaction flask was placed 0.25 mole of the acid-lactone. After heating the acid-lactone to a temperature of 192° C., 0.28 mole of the amine was added slowly with stirring and the reaction mixture heated for a period of time of 1.5 hours while maintaining the temperature in the range of 192–198° C. At the end of this time, the reaction mixture was dissolved in diethyl ether, washed with dilute hydrochloric acid, followed by washing with dilute sodium hydroxide, and finally washed with water before being distilled. From the distillation step there was obtained 2-carbohexylaminomethyl - 4 - nonyl-gamma-valerolactone in a yield of 92% boiling at 197–210°C./0.1–0.2 mm. Hg. and having a refractive index $n_D{}^{25}$ 1.4767. Analysis of the product was found to be 71.3% carbon, 11.0% hydrogen and 3.8% nitrogen as compared with calculated values of 71.9 carbon, 11.2% hydrogen and 3.8% nitrogen.

EXAMPLE 5

In this example, 2 - carbo-tert-dodecylaminomethyl-4-nonyl-gamma-valerolactone was prepared from tetrapropenylsuccinc acid-lactone and tert-dodecylamine. Into a reaction flask was placed 0.25 mole of the acid-lactone. After heating the acid-lactone to a temperature of 200° C., 0.38 mole of the amine was added slowly with stirring and the reaction mixture heated for a period of 7 hours while maintaining the temperature in the range of 200–220° C. At the end of this time, the reaction mixture was dissolved in diethyl ether, washed with dilute hydrochloric acid followed by washing with dilute sodium hydroxide and with water, the ether was then removed under vacuum before filtration. From the filtration there was obtained the 2 - carbo-tert-dodecylaminomethyl - 4-nonyl-gamma-valerolactone as a viscous yellow oil in a yield of 66%. Analysis of the product was found to be 75.8% carbon, 11.9% hydrogen and 3.2% nitrogen as compared with calculated values of 74.5% carbon, 11.8% hydrogen and 3.1% nitrogen.

EXAMPLE 6

In this example, 2-carbodiallylaminomethyl - 4-methyl-gamma-valerolactone was prepared from methylallylsuccinic acid-lactone and diallylamine. Into a reaction flask was placed 0.25 mole of the acid-lactone. After heating the acid-lactone to a temperature of 190° C., 0.3 mole of the amine was added slowly with stirring and the reaction mixture heated for a period of 4 hours while maintaining the temperature at 190–200° C. At the end of this time, the reaction product was washed with dilute sodium hydroxide and then with water before distillation. From the distillation step there was obtained the 2-carbodiallylaminomethyl - 4-methyl-gamma-valerolactone boiling at 150–156°C./0.45 mm. Hg. having a refractive index $n_D{}^{25}$ 1.4878. Analysis of this product was found to be 66.9% carbon, 8.7% hydrogen and 5.6% nitrogen as compared with calculated values of 67.0% carbon, 8.4% hydrogen and 5.6% nitrogen.

EXAMPLE 7

In this example, 2-carbo(3-chlorophenyl)aminomethyl-4-methyl-gamma-valerolactone was prepared from methylallylsuccinic acid-lactone and 3-chloroaniline. Into a reaction flask was placed 0.1 mole of the acid-lactone. After heating the acid-lactone to a temperature of 190° C., 0.12 mole of the 3-chloroaniline was added slowly and the reaction mixture heated at a temperature in the range of 190–200° C., for a period of 1 hours At the end of this time, the solid reaction mixt,ure was washed with water, followed by washing with hydrochloric acid and with sodium hydroxide and finally washed with water by filtration. From the filtration there was obtained 2-carbo(3-chlorophenyl)aminomethyl - 4 - methyl-gramma-valerolactone in a yield of 84% as as off-colored solid material having a melting point of 162.5–163.5° C. Analysis of the product was found to be 59.5% carbon, 5.9% hydrogen, 4.9% nitrogen and 12.6% chlorine as compared with calculated values of 59.8% carbon, 5.7% hydrogen, 5.0% nitrogen and 12.6% chlorine.

EXAMPLE 8

In this example, 2-carbo(3-chlorophenyl)aminomethyl-4-nonyl-gamma-valerolactone was prepared from tetrapropenylsuccinic acid-lactone and 3-chloroaniline. Into a reaction flask was placed 0.2 mole of the acid-lactone. After heating the acid-lactone to a temperature of 200° C., 0.22 mole of the 3-chloroaniline was added slowly and the reaction mixture heated for a period of 1.3 hours at a temperature of 200° C. At the end of this time, the reaction mixture was dissolved in diethyl ether, washed with dilute hydrochloric acid, followed by washing with dilute sodium hydroxide, and finally washed with water. The ether was removed under vacuum and the product filtered. From the filtration step there was obtained 2-carbo(3-chlorophenyl) amino-methyl - 4 - nonyl-gamma-valerolactone in a yield of 65;% as a yellow oil. Analysis of the product was found to be 67.2% carbon, 8.3% hydrogen, 3.6% nitrogen and 9.0% chlorine as compared with calculated values of 67.1% carbon, 8.2% hydrogen, 3.6% nitrogen and 9.0% chlorine.

EXAMPLE 9

In this example, 2-carbodiallylaminomethyl - 4-nonyl-gamma-valerolactone was prepared from tetrapropenylsuccinic acid-lactone and diallylamine. Into a reaction flask was placed 0.2 mole of the acid-lactone. After heating the acid-lactone to a temperature of 200° C., 0.22 mole of the amine was added slowly and the reaction mixture heated for a period of an hour while maintaining the temperature in the range of 200–250° C. At the end of this time, the reaction mixture was washed with dilute sodium hydroxide followed by washing with water and then distilled. From the distillation step there was obtained the 2 - carbodiallylaminomethyl - 4-nonyl-gamma-valerolactone boiling at 155–180°C./0.5–0.18 mm. Hg. and having a refractive index $n_D{}^{25}$ 1.4851. Analysis of the product was found to be 72.8% carbon, 10.3% hydrogen, and 4.0% nitrogen as compared with calculated values of 72.7% carbon, 10.3% hydrogen and 3.9% nitrogen.

EXAMPLE 10

In this example, the plasticizer properties of 2-carbodibutylaminomethyl-4-nonyl-gamma-valerolactone was determined for use in polyvinyl chloride resins. A resin composition was formulated comprising 60 parts of the polyvinyl chloride resin and 40 parts of the 2-carbodibutylaminomethyl-4-nonyl-gamma-valerolactone, including ¼ phr. of dibasic lead stearate as a heat stabilizer. These materials were mixed in a rolling mill to form a homogeneous blend and visual inspection of the compositions indicated that all of the amide-lactone was compatible with the polyvinyl chloride. Molded sheets of the milled mixture where clear and transparent. The composition was found to have a low-temperature flex point of 2° C., volatility of 2.7% plasticizer lost, kerosene extraction of 0.9% plasticizer lost and loop compatibility. The low temperature flexibility was determined according to the Clash-Berg Method wherein the torsional flexibility of the sample is determined at various temperatures. The volatility was determined according to the Carbon Absorption Method of the Society of the Plastics Industry. The amount of kerosene extraction was determined by immersion of a sample in kerosene for a period of 24 hours, followed by a determination of the loss in weight of the sample.

EXAMPLE 11

In this example, 2-carbohexylaminomethyl-4-nonyl-gamma-valerolactone and 2-carbo-tert-dodecylaminomethyl-4-nonyl-gamma-valerolactone were evaluated as plasticizers for polyvinyl chloride by a film casting technique. Each compound was added to a solution of the polymer in a cyclohexanone solvent and the solvent mixture thoroughly mixed to insure homogeneity. Thereafter, the mixture was poured out on a small polished plate and distributed with a spreader to form a film which was allowed to dry. The dried film was stapled to a card and after drying for 2 weeks, the film was examined for incompatibility as evidenced by cloudiness or an oily surface. Each of these two amide-lactones were judged to be fully compatible with polyvinyl chloride resin.

The ratio of amide-lactone to polyvinyl halide resin in the polyvinyl halide resin compositions of this invention may be varied over a wide range, depending upon the properties desired in the final product. For some purposes, a plasticizer content of say from only 2–5% would be desirable; however, usually a plasticizer content above 10% is used. The present amide-lactone products are compatible with polyvinyl chloride over wide ranges in concentrations up to 50% of amide-lactone based on the total weight of the plasticized composition.

This invention has been described particularly with reference to the use of the present amide-lactone products as plasticizers for polyvinyl chloride, but these amide-lactone products are also advantageously employed as plasticizers for copolymers of vinyl chloride, for example, vinyl chloride-vinyl acetate copolymers, vinyl chloride-acrylonitrile copolymers, vinyl chloride-vinylidene chloride copolymers, vinyl chloride-vinylidene chloride-acrylonitrile copolymers, and the like. Preferably, such copolymers have a vinyl chloride content of at least 70% by weight and up to 30% by weight of the coplymerizable monomer.

The plasticized polyvinyl halide compositions of the present invention have good thermal stability; however, it may be desirable for various purposes to include known stabilizers in the plasticized composition. Inasmuch as the present amide-lactone products are substantially unreactive with the commercially available heat and light stabilizers which are commonly employed with polyvinyl halide resins, the presence of such materials in the plasticized compositions does not impair the valuable properties of the amide-lactone products.

The amide-lactones employed in this invention, either singularly or in combination, are incorporated with the polyvinyl halide resin to form a plasticized polyvinyl halide resin by either milling or by dissolving therein the plasticizer in a mutual solvent and allowing the solvent to evaporate, or by any other conventional technique. Colors, dyes, extenders, pigments, and other compounding ingredients can be included in the plasticized polyvinyl halide composition if it is so desired.

Reasonable variation and modification of the invention as described are possible, the essence of which is that there have been provided: (1) a process for reacting alkenylsuccinic acid-lactones with amines to form amide-lactones of the same, (2) said amide-lactones as new compounds, (3) methods for plasticizing polyvinyl halide resins by incorporating therewith a plasticizing amount of said amide-lactones, and (4) plasticized polyvinyl halide compositions containing a plasticizing amount of said amide-lactones.

We claim:
1. The resinous composition comprising a vinyl chloride polymer, selected from the group consisting of a polyvinyl chloride homopolymer and a copolymer of at least 70% by weight of vinyl chloride and up to 30% by weight of an ethylenically unsaturated comonomer copolymerizable therewith, plasticized with an alkenylsuccinic amide-lactone defined by the formula

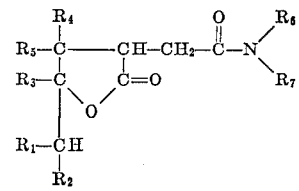

wherein $R_1$, $R_2$, $R_3$, $R_4$, $R_5$ and $R_6$ are each selected from the group consisting of hydrogen and alkyl radicals and $R_7$ is selected from the group consisting of alkyl, aryl, alkaryl, haloaryl, aralkyl and alkenyl radicals, and the R groups each contain up to 20 carbon atoms.

2. The resinous composition of claim 1 comprising a vinyl chloride polymer plasticized with 2-carbodibutyl-aminomethyl-4-nonyl-gamma-valerolactone.

3. The resinous composition of claim 1 comprising a vinyl chloride polymer plasticized with 2-carbohexyl-aminomethyl-4-nonyl-gamma-valerolactone.

4. The resinous composition of claim 1 comprising a vinyl chloride polymer plasticized with 2-carbo-tert-dodecylaminomethyl-4-nonyl-gamma-valerolactone.

5. The resinous composition of claim 1, wherein up to 50 weight percent of the alkenylsuccinic amide-lactone plasticizer, based on the total weight of the resinous composition, is employed.

6. The resinous composition of claim 1, wherein up to 10 weight percent of the alkenylsuccinic amide-lactone plasticizer, based on the total weight of the resinous composition, is employed.

7. The resinous composition of claim 5, wherein the vinyl chloride polymer is a polyvinyl chloride homopolymer.

8. The resinous composition of claim 5, wherein the vinyl chloride polymer is a copolymer of at least 70% by weight of vinyl chloride and up to 30% by weight of an ethylenically unsaturated comonomer copolymerizable therewith.

References Cited
UNITED STATES PATENTS 3,155,685 11/1964 Prill et al. _____ 260—30.4 X
3,267,062 8/1966 Prill et al. _____ 260—30.4

MORRIS LIEBMAN, Primary Examiner

L. T. JACOBS, Assistant Examiner

U.S. Cl. X.R.
162—603.26